Dec. 12, 1950 V. E. CACCIOTTI 2,533,763
QUICK DETACHABLE BATTERY CONNECTOR
Filed April 6, 1948
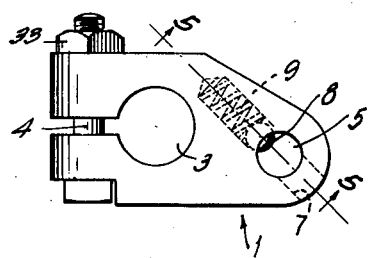
FIG. 1
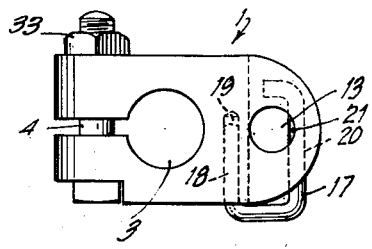
FIG. 2
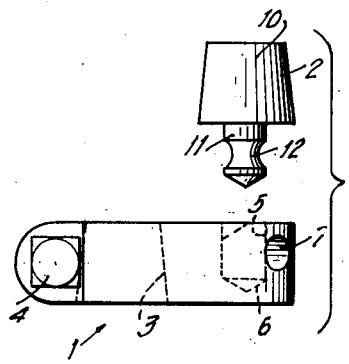
FIG. 3
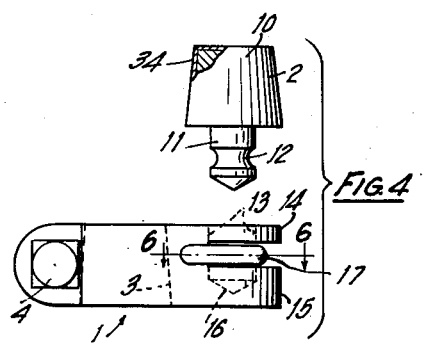
FIG. 4
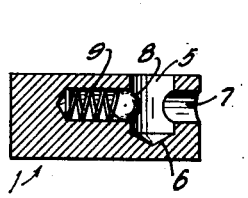
FIG. 5
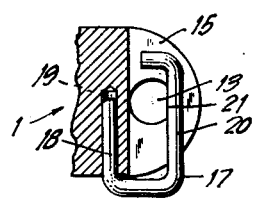
FIG. 6
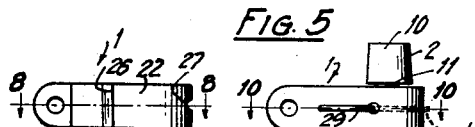
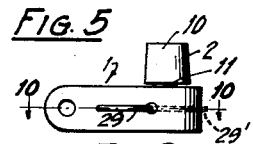
FIG. 7   FIG. 9
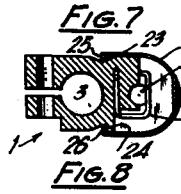
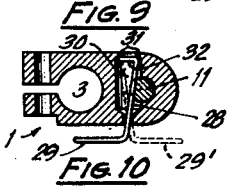
FIG. 8   FIG. 10
INVENTOR.
Vincent E. Cacciotti
BY
ATTORNEY Patented Dec. 12, 1950

2,533,763

UNITED STATES PATENT OFFICE 2,533,763

QUICK DETACHABLE BATTERY CONNECTOR

Vincent E. Cacciotti, Troy, N. Y.

Application April 6, 1948, Serial No. 19,378

7 Claims. (Cl. 173—259)

My invention relates to storage batteries and more particularly to a quick detachable means for connecting cables to the terminals of storage batteries used in motor vehicles and otherwise.

Various devices of this character have been heretofore proposed but most of them, so far as I am aware, are more or less complicated and cannot be readily applied in the storage battery of a motor vehicle without providing the cables with special types of terminals. Moreover, the connectors heretofore proposed are readily susceptible to corrosion which interferes with the proper functioning thereof both as a current carrying element and as a means for quickly detaching the cables from the battery.

One of the objects of my invention is to provide a device of this character of extremely simple construction and which may be applied to any storage battery in a motor vehicle without changing, or in any way modifying, the terminals of the cables which were connected to the battery before my connector is installed. Another object is to provide a device of this character which is of such construction that certain vital parts thereof are entirely enclosed and may be packed with grease to prevent corrosion thereof. A further object is to provide a device of this character in which the surfaces thereof which would normally be exposed to corrosion are protected by a coating of corrosion resistant material.

I accomplish these objects by means of the novel elements and the combinations and arrangements thereof described below and illustrated in the accompanying drawings in which—

Fig. 1 is a plan view of one element of my connector;

Fig. 2 is a plan view of a modification of said one element;

Fig. 3 is an exploded elevation view of my connector showing the element illustrated in plan in Fig. 1, and an elevation view of the other element;

Fig. 4 is an exploded elevation view of my connector showing the element illustrated in plan in Fig. 2, together with the other element, a portion of which is broken away;

Fig. 5 is a section of Fig. 1 in the plane 5—5;

Fig. 6 is a fragmentary section of Fig. 4 in the plane 6—6;

Fig. 7 is an elevation view of the preferred form of the one element of my connector drawn to a somewhat smaller scale than Figs. 1 and 6;

Fig. 8 is a section of Fig. 7 in the plane 8—8;

Fig. 9 is an elevation view of another modification of my connector; and

Fig. 10 is a section of Fig. 9 in the plane 10—10.

Referring to the drawings—

My connector in each case comprises an element, represented generally in all the figures by the numeral 1, adapted to be connected to the terminal of a storage battery; and an element 2 adapted to be connected to a cable terminal. The element 1, in all cases, is provided with a frustoconical passage 3 therethrough adapted to fit closely over the frusto-conical terminal of the storage battery and with a clamping bolt 4 adapted to clamp the element tightly about said terminal. The element 1, illustrated in Figs. 1 and 3, is also provided with a cylindrical recess 5 which terminates somewhat short of the bottom of the element 1, as shown at 6 in Fig. 3. A hole 7 intersecting the recess 5 is drilled into the element 1 to receive a ball latch 8 which projects slightly into the recess 5 and is yieldingly so held by the helical spring 9.

The other element 2 of my connector is identical or substantially identical in all species and comprises a frusto-conical head 10 having a cylindrical extension 11 on the bottom thereof which is provided with a circumferential groove 12 adapted, when used with the element 1 just described, to cooperate with the ball latch 8 in order yieldingly to retain the extension 11 when inserted in the recess 5 in the element 1.

In Figs. 2 and 4 I have illustrated a slight modification of the element 1 in respect of the type of latch which cooperates with the extension on the element 2 when inserted in the recess 13. In order to accommodate the type of latch illustrated in Figs. 2 and 4, the end of the element 1 is bifurcated, as best shown in Fig. 4. The recess 13 passes entirely through the branch 14 of the bifurcated portion but only partially through the branch 15, as shown at 16 in Fig. 4. The latch in this case comprises a generally U-shaped spring 17 having one end 18 thereof driven tightly into a hole 19 in the element 1 and the other branch 20 thereof positioned between the branches 14 and 15 of the bifurcation and having a portion 21 thereof passing through the recess 13. Thus, when the extension on the element 2 is thrust into the recess, the portion of the U-shaped spring within the recess will cooperate with the groove 12 in the element 2 yieldingly to retain the element 2 connected to the element 1. The free end of the branch 20 is bent at right angles to eliminate any possibility of the spring 17 being pulled out of the element 1 when element 2 is in cooperation therewith. The element of my connector shown in Figs. 7 to 10 inclusive is substantially identical with that shown in Figs. 4 and 6, and the same parts bear the same numbers. In Figs. 7 and 8, I have merely provided the bifurcated portion of element 1 with a resilient cover 22 which can be snapped into place on the element 1 in order completely to close the space between the branches of the bifurcation. Shoulders 23 and 24 may be provided on the element 1 to engage the inturned ends 25 and 26 of the cover 22, and the cover 22 may be provided with a struck-in portion 27 adapted to enter the space between the branches of the bifurcation to prevent the cover from moving vertically on the element 1.

The element represented generally at 1 in Figs. 9 and 10, differs slightly from the similar elements shown in the other figures in that it is provided with a manually operable latch 28 having an external handle 29 by which it may be turned from the position shown in solid outline in Figs. 9 and 10 when it is in engagement with the extension 11 on the element 2 to the position shown in dotted outline at 29' so that it is disengaged from the extension 11 on the element 2. The manually operable latch comprises merely a piece of fairly stiff wire bent as shown and which is positioned in a cylindrical chamber 30 in the element 1. It is retained within the chamber by inturning the edge of the entrance to the chamber, as shown at 31, which retain the end 32 within the chamber.

In operation, my connector may be readily attached to one or preferably both terminals of a storage battery. If cables are already connected to the terminals of the battery, these are removed and an element 1 connected to each terminal by slipping it over the terminal and tightening the clamping nut 33. The frusto-conical head of the plug-like element 2 is secured to the cable by inserting it in the opening thereof which formerly surrounded the battery terminal. The element 2 and its attached cable may be electrically connected to the terminal of the battery by merely pushing the extension 11 into the recess therefor in the element 1 where it will be yieldingly retained by means of the cooperating latch. In order to disconnect the cable from the battery it is merely necessary to pull the extension 11 on the plug out of the recess in the element 1 where the element 1 is equipped with a spring latch, but where the latch is a manually operable one, as shown in Figs. 9 and 10, the latch must, of course, be first turned to free the element 2.

It is well known that ordinary cable connectors are vulnerable to the corrosive effect of the battery acid or fumes therefrom and for this reason it is the usual practice to coat the connectors with grease. In the case of my connector however, I prefer to form it of brass and to apply a coating of lead 34 (see Fig. 4) to all of the exposed surfaces thereof. This may be easily done by dipping the elements of the connector in a suitable flux solution and then dipping them in a bath of molten lead or solder which will effect a protective "tinning" thereof. Furthermore, where the element 1 is provided with a cover such as shown at 22, the space between the branches of the bifurcated portion, which will be completely enclosed, may be packed with grease.

While I have described my invention in its preferred embodiment, it is to be understood that the words which I have used are words of description rather than of limitation and that changes, within the purview of the appended claims, may be made without departing from the true scope and spirit of my invention in its broader aspects.

What I claim is:

1. A quick detachable connector for a storage battery terminal comprising a metallic clamp element provided with a frusto-conical passage adapted to fit around the terminal of a storage battery and means for clamping said element tightly around said terminal, and a metallic plug element having a frusto-conical portion substantially complementary in shape to the passage in said clamp element, whereby it is adapted to be connected to a cable terminal normally connected to said battery terminal; said clamp element being provided with a recess therein and a latch having a portion projecting into said recess; and said plug element having an extension receivable in said recess provided with means adapted to cooperate with said latch for releasably locking said extension in said recess; said extension being readily removable from said recess merely by pulling it therefrom.

2. A quick detachable connector for a storage battery terminal comprising a first metallic element having a frusto-conical passage therethrough adapted to fit closely over a storage battery terminal, and a clamping bolt for securing said element to said terminal; said element having a bifurcated portion, provided with a cylindrical recess extending entirely through one of the branches of said bifurcated portion but only partially through the other branch thereof; a U-shaped spring having one branch secured in said element and the other branch free and having a portion thereof disposed in said recess, and a second, metallic, plug-like element having a frusto-conical head substantially complementary to the frusto-conical passage through said first element and a cylindrical extension on the bottom of said head adapted to fit closely in said recess; said extension being provided with a groove therein adapted to cooperate with said spring for yieldingly retaining said plug in said recess when inserted therein; whereby said elements, when interfitted, can be readily separated by merely pulling them apart.

3. A quick detachable connector for a storage battery terminal comprising a first metallic element having a frusto-conical passage therethrough adapted to fit closely over a storage battery terminal, and a clamping bolt for securing said element to said terminal; said element being also provided with a cylindrical recess having its axis disposed substantially parallel to the axis of said passage, and a resilient latch projecting into said recess; and a second, plug-like, metallic element having a portion adapted to be inserted in said recess and to be frictionally engaged by said latch, and having a frusto-conical terminal thereon substantially complementary to the frusto-conical passage through said first element; whereby the terminal of a cable adapted to be connected to said battery terminal may be connected to the terminal on said plug-like element.

4. The structure set forth in claim 2 provided with a removable cover frictionally cooperating with first element and laterally surrounding said bifurcated portion to form a closure for the space between the branches thereof adapting said space to be packed with grease to prevent corrosion.

5. A quick detachable connector for a storage battery terminal comprising a metallic clamp element provided with a frusto-conical passage adapted to fit around the terminal of a storage battery and means for clamping said element tightly around said terminal, and a metallic plug element having a frusto-conical portion substantially complementary in shape to the passage in said clamp element, whereby it is adapted to be connected to a cable terminal normally connected to said battery terminal; said clamp element being provided with a recess therein and a manually operable latch projecting into said recess; and said plug element being provided with an extension receivable in said recess and having means adapted to cooperate with said latch for releasably locking said extension in said recess.

6. A quick detachable connector for a storage battery terminal comprising a first metallic element having a frusto-conical passage therethrough adapted to fit closely over a storage battery terminal, and a clamping bolt for securing said element to said terminal; said element having a bifurcated portion, provided with a cylindrical recess extending entirely through one of the branches of said bifurcated portion but only partially through the other branch thereof; a U-shaped spring having one branch secured in said element and the other branch free and having a portion thereof disposed in said recess, and a second metallic plug-like element having a frusto-conical head substantially complementary to the frusto-conical passage through said first element and a cylindrical extension on the bottom of said head adapted to fit closely in said recess; said extension being provided with a groove adapted to cooperate with said spring for yieldably retaining said plug in said recess when inserted therein; the exterior surface of said connector being coated with lead to prevent corrosion thereof; and a resilient cover element in removable engagement with said first element and closing the opening between the branches of said bifurcated portion to form a closed space therebetween adapted to be packed with grease.

7. A quick detachable connector for a storage battery terminal comprising a pair of metal elements having portions closely interfitted but readily separable by merely pulling them apart; said elements being provided with cooperating, latch-forming means for preventing accidental separation of said elements when interfitted; one of said elements having a frusto-conical passage therein adapted to fit closely about a storage battery terminal, and the other of said elements having a frusto-conical portion complementary in shape to said frusto-conical passage; whereby said connector may be readily interposed between said battery terminal and a cable normally connected thereto by merely disconnecting said cable from said battery terminal and connecting it to the frusto-conical portion of said connector, and attaching said connector to said battery by inserting the terminal of said battery in said frusto-conical passage.

VINCENT E. CACCIOTTI.

REFERENCES CITED

The following references are of record in the file of this patent:

UNITED STATES PATENTS

| Number | Name | Date |
|---|---|---|
| 1,176,942 | Bliss | Mar. 28, 1916 |
| 1,507,936 | Schmitt | Sept. 9, 1924 |
| 1,957,131 | Brown | May 1, 1934 |
| 2,010,452 | Douglas | Aug. 6, 1935 |
| 2,177,518 | Douglas | Oct. 24, 1939 |
| 2,299,291 | Zam | Oct. 20, 1942 |
| 2,340,011 | Moore | Jan. 25, 1944 |

FOREIGN PATENTS

| Number | Country | Date |
|---|---|---|
| 478,013 | England | Jan. 11, 1938 |